(12) United States Patent
Lin et al.

(10) Patent No.: US 9,467,394 B2
(45) Date of Patent: *Oct. 11, 2016

(54) TIME AND FREQUENCY DIVERSITY MODULATION SYSTEM AND METHOD

(71) Applicant: Texas Instruments Incorporated, Dallas, TX (US)

(72) Inventors: Jing Lin, Austin, TX (US); Tarkesh Pande, Richardson, TX (US); Il Han Kim, Allen, TX (US); Anuj Batra, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/450,046

(22) Filed: Aug. 1, 2014

(65) Prior Publication Data
US 2015/0071306 A1   Mar. 12, 2015

Related U.S. Application Data

(60) Provisional application No. 61/877,097, filed on Sep. 12, 2013.

(51) Int. Cl.
*H04W 4/00* (2009.01)
*H04J 3/22* (2006.01)
*H04L 1/04* (2006.01)
(Continued)

(52) U.S. Cl.
CPC ............. *H04L 47/826* (2013.01); *H04B 3/542* (2013.01); *H04L 1/0071* (2013.01); *H04L 27/2627* (2013.01); *H04L 27/3472* (2013.01); *H04B 2203/5408* (2013.01); *H04B 2203/5425* (2013.01); *H04L 5/0007* (2013.01); *H04L 27/366* (2013.01)

(58) Field of Classification Search
CPC . H04L 1/0071; H04L 5/0007; H04L 5/0016; H04L 5/0023; H04L 5/0046; H04L 5/0092; H04L 5/0094; H04L 12/911; H04L 27/20; H04L 27/2601; H04L 27/366; H04L 27/2627; H04L 27/2628; H04L 27/2634; H04L 27/3472; H04L 47/826; H04B 3/542; H04B 2203/5404; H04B 2203/5408; H04B 2203/5416; H04B 2203/5425
USPC ................ 370/264–265, 436–437, 468, 478, 370/485–490; 375/259–260, 267, 299, 347
See application file for complete search history.

(56) References Cited

U.S. PATENT DOCUMENTS 7,417,964 B2 * 8/2008 Cho .................. H04L 5/006
370/210
8,223,880 B2 * 7/2012 Baril ................ H02J 13/0051
375/295

(Continued)

*Primary Examiner* — Tri H Phan
(74) *Attorney, Agent, or Firm* — John R. Pessetto; Frank D. Cimino

(57) ABSTRACT

A method of encoding a set of L bits for transmission on a transmission band through a transmission medium is provided, wherein L is a positive integer that is greater than 1. The method includes: mapping, via a mapping component, the L bits into M symbols; dividing, via a first dividing component, the transmission band into sub-bands; allocating, via an allocating component, the M symbols to individual sub-bands, respectively, for transmission at a first time; and allocating, via the allocating component, the M symbols to different individual sub-bands, respectively, for transmission at a second time.

19 Claims, 12 Drawing Sheets

(51) Int. Cl.
*H04L 12/911* (2013.01)
*H04L 27/34* (2006.01)
*H04B 3/54* (2006.01)
*H04L 1/00* (2006.01)
*H04L 27/26* (2006.01)
*H04L 5/00* (2006.01)
*H04L 27/36* (2006.01)

(56) References Cited

U.S. PATENT DOCUMENTS

| | | | | |
|---|---|---|---|---|
| 8,582,596 B2* | 11/2013 | Agrawal | H04B 7/2656 | 370/442 |
| 2006/0056281 A1* | 3/2006 | Ngo | H04L 27/2649 | 370/208 |
| 2006/0104377 A1* | 5/2006 | Chimitt | H04B 7/0669 | 375/261 |
| 2007/0258529 A1* | 11/2007 | Liang | H04L 5/023 | 375/260 |
| 2010/0008346 A1* | 1/2010 | Shirakata | H04L 25/0228 | 370/343 |
| 2010/0034165 A1* | 2/2010 | Han | H04L 5/023 | 370/330 |
| 2010/0316153 A1* | 12/2010 | Wang | H04L 1/0071 | 375/260 |
| 2011/0043340 A1* | 2/2011 | Kim | H04B 3/542 | 375/260 |
| 2011/0280261 A1* | 11/2011 | Varadarajan | H04L 27/2602 | 370/475 |
| 2014/0153625 A1* | 6/2014 | Vojcic | H04L 1/005 | 375/224 |
| 2014/0294002 A1* | 10/2014 | Kim | H04N 21/236 | 370/390 |
| 2015/0043596 A1* | 2/2015 | Lin | H04L 5/0048 | 370/437 |

* cited by examiner

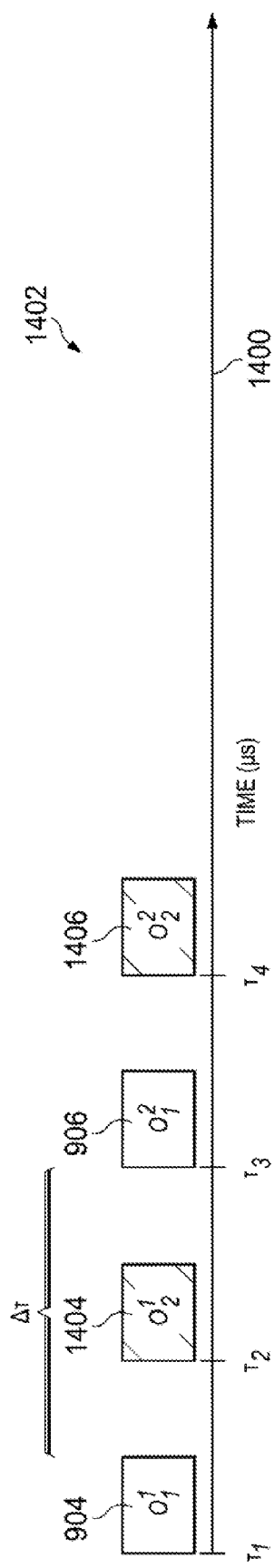
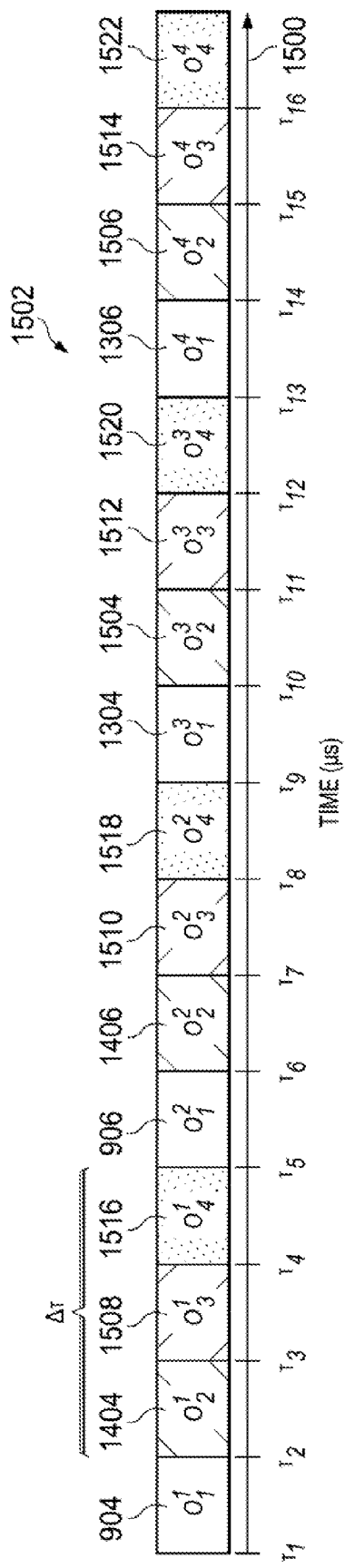

TIME AND FREQUENCY DIVERSITY MODULATION SYSTEM AND METHOD

The present application claims priority from: U.S. Provisional Application No. 61/877,097 filed Sep. 12, 2013, the entire disclosure of which is incorporated herein by reference.

BACKGROUND

The present invention is generally drawn to a system and method for modulating transmitted data to improve the robustness of power-line communications (PLC).

FIG. 1 illustrates a conventional power-line communications system 100.

As shown in the figure, system 100 includes an AC generator 101, a power transmission line 102, multiple power transmission line supports 104, a transmitter 110, communication signal transmission lines 112 and 116 and a receiver 114.

AC generator 101 is connected to power transmission line 102, which is supported by power transmission line supports 104. Transmitter 110 is connected to power transmission line by way of communication signal transmission line 112. Receiver 114 is connected to power transmission line 102 by way of communication signal transmission line 116.

AC generator 101 is operable to generate and distribute AC power through power transmission line 102 to users not shown. Transmitter 110 is operable to transmit a communication signal to power transmission line 102 through communication signal transmission line 112. Receiver 114 is operable to receive communication signal transmitted through power transmission line 102 by way of communications signal transmission line 116.

In operation, AC generator 101 generates electrical power to be distributed to users not shown by way of power transmission line 102, which is supported by multiple power transmission lines supports 104. Transmitter 110 generates a communication signal and transmits the signal by way of signal transmission line 112 to power transmission line 102. The communication signal is propagated by power transmission line 102 and delivered to receiver 114 by communication signal transmission line 116.

Primary impairments that limit communication performance of PLC include frequency selective channel, narrowband interference, and impulsive noise. Frequency selective channel impairments are drawn to signal distortions that are a function of a frequency within a channel in a communication line. Frequency selective channel impairments are based on attributes of the communication medium, e.g., the material of the power line in PLC systems. Narrowband interference is interference within a small portion of the band transmitted by the transmitter. For example, for purposes of discussion, suppose a transmitter is able to transmit in a band from 0 to 500 kHz. In such a transmission scheme, narrowband interference may be interference with the band of 50 kHz to 75 kHz. Impulsive noise may be attributed to electrical devices within the power delivery system. All of these impairments may attenuate and/or delay data transmitted over a power line at different amounts based on the transmission frequency. These inconsistent attenuations and/or delays may cause errors in a received signal in PLC system.

Traditionally, repetition coding is used to improve the robustness of PLC in harsh channel and noise environments, at the price of decreased data rates. As an example IEEE 1901.2, ITU-T G.9903 G3-PLC and ITU-T G9904 PRIME have modes like ROBO (Robust) mode and Super ROBO mode where the bit is repeated either 4 or 6 times. In this manner, even if one, or some, of the repeated bits are corrupted during transmission, there is an increased likelihood that one, or many others, of the repeated bits will be correctly received.

Dual carrier modulation (DCM) has been proposed to combat frequency selective channels in multi-band ultrawideband (MB-UWB) wireless communication systems using Orthogonal Frequency Division Multiplexing (OFDM) for coherent systems. DCM maps four bits to two different 16-QAM symbols, which are allocated to two sub-bands that are separated by a fixed number of sub-bands. In case one of the two symbols is lost or unrecoverable, it is still possible to recover the four bits from the other symbol. The communication reliability is therefore improved. Using 16-QAM however entails that the system is a coherent system and pilots need to be sent in order to estimate the channel. In particular, the pilots are used to estimate the amplitude and phase of the frequency-selective channel. The channel estimation is then used by the receiver to compensate for amplitude and phase distortion imposed by the channel to subsequently received data. A disadvantage with coherent systems is that the introduction of pilots results in a loss of data rate as compared to a differential system.

As mentioned above, another type of impairment in PLC communication is impulsive noise. Impulsive noise may be attributed to active power components, throughout the power system, that introduce periodic impulsive bursts for noise in the PLC communication system transmission. In PLC, impulsive noise bursts typically span more than one OFDM symbol and have a periodicity equal to half the AC main cycle.

Impulsive noise will be described with reference to FIG. 2.

FIG. 2 is a graph 200 illustrating impulsive noise in a PLC line with respect to a 50 Hz main cycle.

As shown in the figure, graph 200 has a y-axis 202, an x-axis 204 and a function 206.

Y-axis 202 corresponds to the amplitude of an example signal in a PLC line and is measured in volts, whereas x-axis 204 corresponds to time and is measure in ms. Function 206 corresponds to a signal on the PLC line. Function 206 includes a plurality of impulses, samples of which are labeled 208 and 210. The impulses have a period as indicated by double arrow 212, with an ON period indicated by double arrow 214 and an OFF period indicated by double arrow 216. The ON period of the impulses have an average amplitude indicated by double arrow 218, whereas the OFF period of the impulses has an average amplitude indicated by double arrow 220.

Even if DCM is implemented on an impulsive noise channel, there will not be a performance advantage because all of the sub-bands within an OFDM symbol will be corrupted when the impulsive noise occurs. In particular, returning to FIG. 1, suppose that an OFDM symbol were transmitted from transmitter 110 to receiver 114 via transmission line 102. Further, for purposes of discussion, let the noise profile corresponding to function 206, as shown in FIG. 2, be present in transmission line 102. DCM on one OFDM symbol might somewhat address frequency selective channel, narrowband interference associated with transmission line 102. However, if the OFDM symbol were transmitted so as to coincide with an impulse of function 206, for example impulse 208 or 210 as shown in FIG. 2, then the transmitted OFDM symbol would be corrupted as a result of the impulse.

What is needed is a modulation system and method that addresses impairments that limit communication performance of PLC and that does not decrease data rate as much as conventional systems and methods.

BRIEF SUMMARY

The present invention provides a modulation system and method that addresses impairments that limit communication performance of PLC and that does not decrease data rate as much as conventional systems and methods.

In accordance with aspects of the present invention, a method of encoding a set of L bits for transmission on a transmission band through a transmission medium is provided, wherein L is a positive integer that is greater than 1. The method includes: mapping, via a mapping component, the L bits into M symbols; dividing, via a first dividing component, the transmission band into sub-bands; allocating, via an allocating component, the M symbols to individual sub-bands, respectively, for transmission at a first time; and allocating, via the allocating component, the M symbols to different individual sub-bands, respectively, for transmission at a second time.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIG. 14 illustrates another stream of orthogonal frequency division multiplexing (OFDM) symbols for transmission in accordance with aspects of the present invention;

FIG. 15 illustrates another stream of orthogonal frequency division multiplexing (OFDM) symbols for transmission in accordance with aspects of the present invention;

DETAILED DESCRIPTION

Figure 1:
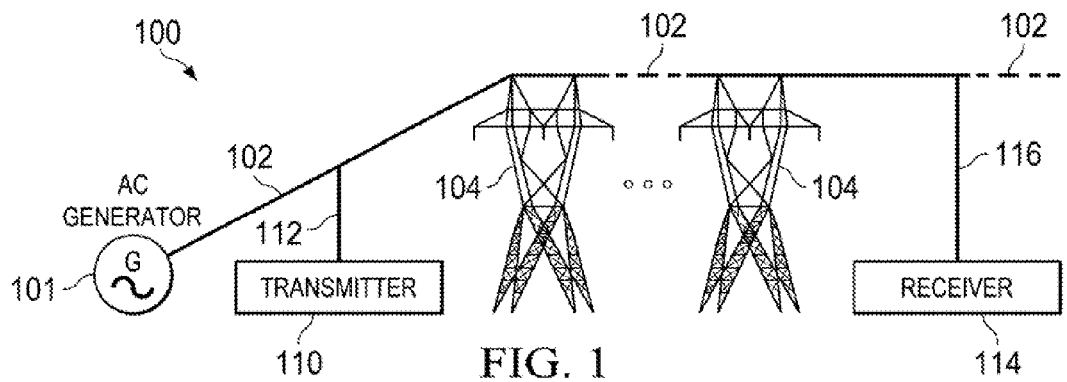
FIG. 1 illustrates a conventional power-line communications system.

Aspects of the present invention are drawn to a time-frequency diversity modulation (TFDM) technique that exploits both the diversity in the time-domain and frequency-domain to improve the reliability of the PLC systems. Diversity in frequency-domain provides robustness from both narrowband interference and frequency-selectivity of the channel. Diversity in the time-domain provides robustness due to impulsive noise and time varying nature of the channel.

In TFDM, L (not necessarily consecutive) bits are mapped onto M symbols which are selected from M constellations, where the mapping from bits to symbols may be the same for all M constellations, or may be different for all M constellations, or mixed: some the same, some different. The M symbols may then be allocated to M sub-bands over multiple OFDM symbols. The sub-band allocation is chosen so that the sub-bands are spaced sufficiently apart, so that the effects of a frequency-selective channel or frequency-domain narrowband interferer impact as few OFDM sub-bands as possible. Likewise the M symbols may be mapped to P (P≤M) OFDM symbols so that if there is a time-domain impulsive noise spike at least one of the M-symbols is left unaffected. Note that in some embodiments the number of mapped symbols (M) may not be equal to L as shown in Table 1. As an example, in one embodiment 4 bits may be mapped to two 16-QAM (or 16PSK or 16-APSK) symbols, whereas, in another embodiment where more robustness is required, 4 bits may be mapped to four 16-QAM (or 16PSK or 16-APSK) symbols.

TABLE 1

Possible combinations of number of mapped symbols versus bits

| Number of bits (L) | Constellation | Mapped Symbols (M) |
|---|---|---|
| 2 | QPSK | M = 2; {$S_1(1), S_1(2)$} |
| 3 | 8PSK/8QAM | M = 2; {$S_1(1), S_1(2)$} |
| 3 | 8PSK/8QAM | M = 3; {$S_1(1), S_1(2), S_1(3)$} |
| 4 | 16QAM/16PSK/16APSK | M = 2; {$S_1(1), S_1(2)$} |
| 4 | 16QAM/16PSK/16APSK | M = 3; {$S_1(1), S_1(2), S_1(3)$} |
| 4 | 16QAM/16PSK/16APSK | M = 4; {$S_1(1), S_1(2), S_1(3); S_1(4)$} |

Table 1 is just a representative sample of the various possibilities. It should be noted that those of skill in the art would be able extend (generalize) this table (and concept) to other value of L, M and potential constellations.

The allocation of M symbols to different sub-bands/sub-bands and potentially different OFDM symbols can be viewed in terms of a time-frequency symbol interleaver, i.e., the bit stream is first interleaved; followed by the mapping of bits to multiple symbols using either the same or potentially different constellations; followed by symbol interleaving, which maps the symbols to the appropriate sub-band and symbol; followed by the (coherent or differential) modulator; and then finally by the IFFT.

The simplest example of a TFDM embodiment is for M=2, whereby, the two symbols constructed from L bits are mapped onto two OFDM symbols spaced N symbols apart and onto sub-bands spaced K sub-bands apart. In some embodiments, the sub-band-spacing K and OFDM symbols spacing N may be a pre-configured network level, static parameter or it may be a variable that is communicated through the frame control header in the packet. In channels where there is high frequency selectivity or narrowband interference it is preferable to have a larger value of K. Likewise for links with periodic impulsive noise, if the duty-cycle of the impulsive noise is large relative to the period then the value of N may be large, whereas, if the duty cycle of the impulsive noise is small then the value of N may be equal to 1.

Example embodiments, in accordance with aspects of the present invention, will now be described in greater detail with reference to FIGS. 3-14.

Figure 3:
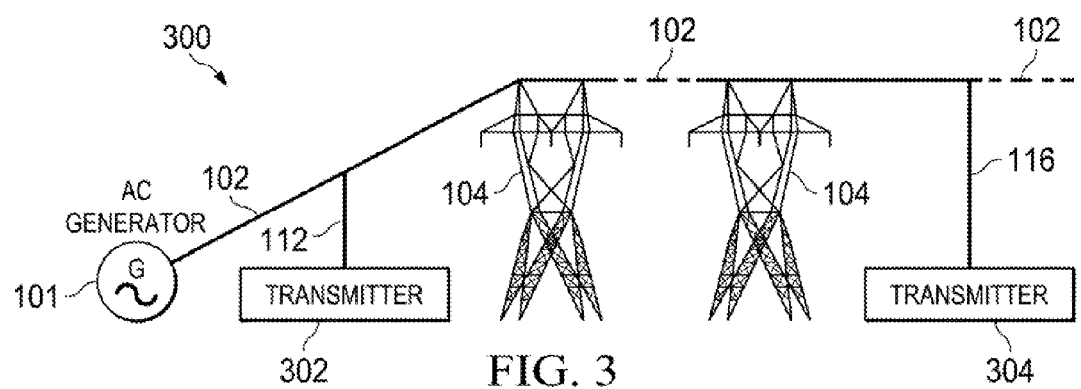
FIG. 3 illustrates a power-line communications system in accordance with aspects of the present invention.

FIG. 3 illustrates a power-line communications system 300 in accordance with aspects of the present invention.

As shown in the figure, system 300 includes AC generator 101, power transmission line 102, multiple power transmission line supports 104, a transmitter 302, communication signal transmission lines 112 and 116 and a receiver 304.

Transmitter 302 is connected to power transmission line 102 by way of communication signal transmission line 116. Receiver 304 is operable to receive communication signal transmitted through power transmission line 102 by way of communications signal transmission line 116.

In accordance with aspects of the present invention, transmitter 302 is able to transmit encoded OFDM symbols so as to reduce the negative effects of impairments that limit communication performance of PLC, which include frequency selective channel, narrowband interference, and impulsive noise. Further, receiver 304 is able to decode the OFDM symbols transmitted by transmitter 302.

In some embodiments, transmitter 302 is able to determine transmission characteristics associated with transmission lines between transmitter 302 and receiver 304. Transmitter 302 may then account for these determined transmission characteristics, when determining how and or when to transmit specific OFDM symbols to address impulsive noise.

In some embodiments, receiver 304 is able to determine transmission characteristics associated with transmission lines between transmitter 302 and receiver 304. Receiver 304 may then send transmission characteristic information that is based on characteristics of the transmission medium, e.g., transmission line 102. Transmitter 302 may then account for these transmission characteristics, when determining how and or when to transmit specific OFDM symbols to address impulsive noise.

A first aspect of the present invention is drawn to transmitter 302 modulating a bit stream of information bits into OFDM symbols for transmission. First the bits in the bit stream are mapped to a first arrangement of symbols, each symbol of which is assigned to a predetermined sub-band, respectively. Then the first arrangement of symbols is transformed into an OFDM symbol for transmission at a first time. The bits in the bit stream are additionally mapped to a second arrangement of symbols, each symbol of which is assigned to a predetermined sub-band, respectively. Then the second arrangement of symbols is transformed into another OFDM symbol for transmission at a later time.

An example of a modulation scheme, in accordance with aspects of the present invention, will now be described in greater detail with reference to FIGS. 4-9.

Figure 4:
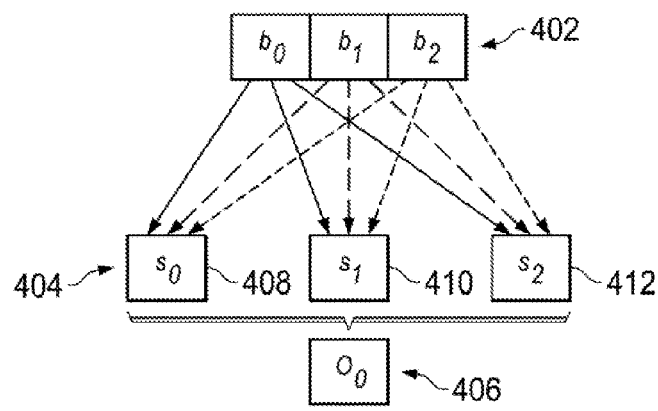
FIG. 4 illustrates an example mapping method in accordance with aspects of the present invention.

FIG. 4 illustrates an example mapping method in accordance with aspects of the present invention.

As shown in figure, the mapping method includes a bit stream 402, a stream of symbols 404 and an OFDM symbol 406. Bit stream 202 includes a plurality of binary bits, shown as $b_0$-$b_2$. Stream of symbols 402 includes a plurality of symbols, shown as $s_0$-$s_2$. Each symbol in stream of symbols 402 is assigned to a specific sub-band for transmission. In this example: symbol $s_0$ is assigned to a sub-band 408; symbol $s_1$ is assigned to a sub-band 410; and symbol $s_2$ is assigned to a sub-band 412.

In this example embodiment, three bits from bit stream 402 are mapped to a single symbol within stream of symbols 404. In particular, in this example: bits $b_0$, $b_1$ and $b_2$ are mapped to symbols $s_0$, $s_1$ and $s_2$.

It should be noted that in the example as shown in FIG. 4, only three bits are mapped to three symbols. However, as will be described later, in accordance with aspects of the present invention, M bits may be mapped to M symbols, wherein M is a positive integer.

There exist a large number of possible symbol mappings, however, there are optimal symbol mappings that can be chosen to minimize the symbol error rate. Bits may be mapped to symbols by any known method, non-limiting examples of which include Phase-shift keying (PSK) and Amplitude and phase-shift keying or asymmetric phase-shift keying (APSK).

Example mappings for mapping three bits to three 8PSK symbols, in accordance with aspects of the present invention, will now be described in greater detail with reference to FIGS. 5A-B. This mapping may be optimal for a particular noise and channel condition.

Figure 5A:
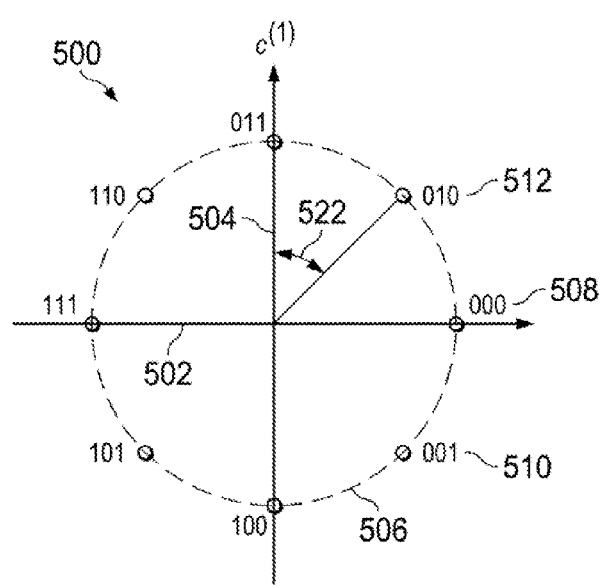
FIG. 5A illustrates an example of an 8PSK mapping constellation.

FIG. 5A illustrates an example of an 8PSK mapping constellation 500.

Phase-shift keying (PSK) is a digital modulation scheme that conveys data by changing, or modulating, the phase of a reference signal (the carrier wave). Any digital modulation scheme uses a finite number of distinct signals to represent digital data. PSK uses a finite number of phases, each assigned a unique pattern of binary digits. Usually, each phase encodes an equal number of bits. Each pattern of bits forms the symbol that is represented by the particular phase. The demodulator, which is designed specifically for the symbol-set used by the modulator, determines the phase of the received signal and maps it back to the symbol it represents, thus recovering the original data. This requires the receiver to be able to compare the phase of the received signal to a reference signal—such a system is termed coherent (and referred to as CPSK). 8PSK is a PSK scheme that maps eight different digital words, i.e., three binary bits, to eight symbols.

As shown in the figure, constellation 500 has an x-axis 502, a y-axis 504 and a radius 506. The constellation allows mappings for 8 binary numbers, for example a bit stream 000 as indicated by 508 lies on radius 506 at phase angle 0°, a bit stream 001 as indicated by 510 lies on radius 506 at phase angle 315° and a bit stream 010 as indicated by 512 lies on radius 506 at phase angle 45°. The mappings are spaced around radius 506 at integer multiples of phase angle 522 which has a value of 45°.

A bit stream corresponds to the different bits that are mapped to a single symbol. For example, consider bit stream 001 as indicated by 510. For purposes of discussion, returning to FIG. 4, let the first bit value "1" in bit stream 001 correspond to bit $b_0$, let the second bit value "0" in bit stream 001 correspond to bit $b_4$, and let the third bit value "0" in bit stream 001 correspond to bit $b_5$. In this example, therefore, the symbol in constellation 500 that corresponds to bit stream 001 corresponds to the bit values of three separated bits in bit stream 402. Accordingly, information corresponding to a unit radius, in this example radius 506, and a specific phase, in this example 315°, sufficiently describes the values of three distinct bits in bit stream 402.

Then, consider bit stream 010 as indicated by 512. For purposes of discussion, returning to FIG. 4, let the first bit value "0" in bit stream 001 correspond to bit $b_1$, let the second bit value "1" in bit stream 010 correspond to bit $b_5$, and let the third bit value "0" in bit stream 010 correspond to bit $b_9$. In this example, therefore, the symbol in constellation 500 that corresponds to bit stream 010 corresponds to the bit values of three separated bits in bit stream 402. Accordingly, information corresponding to a unit radius, in this example radius 506, and a specific phase, in this example 45°, sufficiently describes the values of three distinct bits in bit stream 402.

This mapping continues until all bits within bit stream 402 are mapped to a symbol. In some embodiments, all mappings are performed to a single constellation. In some embodiments mappings may be performed to different constellations.

Figure 5B:
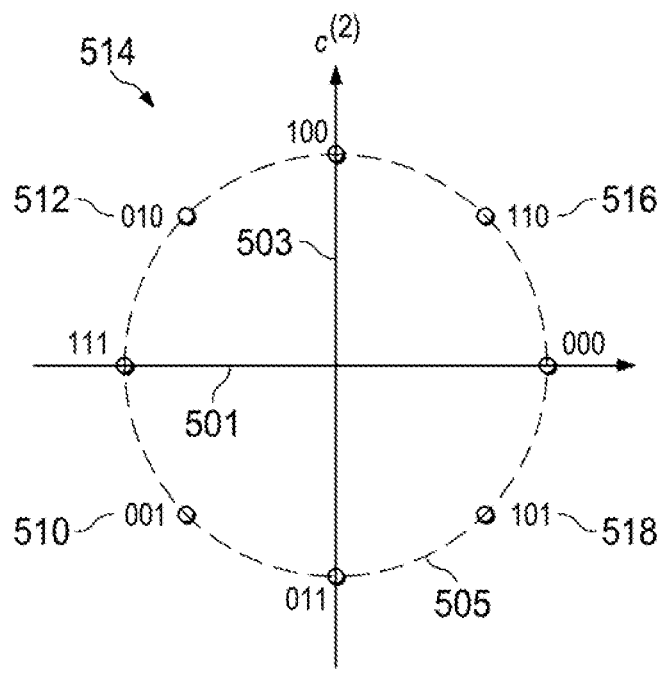
FIG. 5B illustrates another example of an 8PSK mapping constellation.

FIG. 5B illustrates another example of an 8PSK mapping constellation, 514.

As shown in the figure, constellation 514 has an x-axis 501, a y-axis 503 and a radius 505. The constellation allows mappings for 8 binary numbers, spaced around radius 505 at integer multiples of a phase angle of 45°.

Constellation 514 differs from constellation 500 in that values for the bit streams 001 indicated by 510, 010 indicated by 512, 110 indicated by 516 and 101 indicated by 518 have been mapped 225°, 135°, 45° and 315° respectively.

Consider now for example, a bit stream corresponds to the different bits that are mapped to a single symbol. For example, consider bit stream 001 as indicated by 510. For purposes of discussion, returning to FIG. 4, let the first bit value "1" in bit stream 001 correspond to bit $b_0$, let the second bit value "0" in bit stream 001 correspond to bit $b_4$, and let the third bit value "0" in bit stream 001 correspond to bit $b_8$. In this example, therefore, the symbol in constellation 500 that corresponds to bit stream 001 corresponds to the bit values of three separated bits in bit stream 402. Accordingly, information corresponding to a unit radius, in this example radius 506, and a specific phase, in this example 315°, sufficiently describes the values of three distinct bits in bit stream 402.

Then, consider bit stream 010 as indicated by 512. For purposes of discussion, returning to FIG. 4, let the first bit value "0" in bit stream 001 correspond to bit by, let the second bit value "1" in bit stream 010 correspond to bit $b_5$, and let the third bit value "0" in bit stream 010 correspond to bit $b_9$. In this example, therefore, the symbol in constellation 500 that corresponds to bit stream 010 corresponds to the bit values of three separated bits in bit stream 402. Accordingly, information corresponding to a unit radius, in this example radius 506, and a specific phase, in this example 45°, sufficiently describes the values of three distinct bits in bit stream 402. Accordingly, as compared to constellation 500 of FIG. 5A, wherein bit stream 010 corresponded to a symbol associated with a phase of 45°, in constellation 514 of FIG. 5B, bit stream 010 corresponds to a symbol associated with a phase of 135°.

In the non-limiting examples discussed above, bits may be mapped to symbols by a single constellation, or by a plurality of constellations. So long as a receiver has knowledge of the encoding scheme used by a transmitter, the receiver will be able to decode non-compromised data by any known manner or system.

The non-limiting example 8PSK mapping discussed above with reference to FIGS. 5A-B enable mapping of three binary bits to a single 8PSK symbol, of an 8-symbol set. However, aspects of the present invention may be applied to larger symbol sets.

Example mappings for mapping 4 bits to 4 16PSK constellations, in accordance with aspects of the present invention, will now be described in greater detail with reference to FIGS. 6A-B.

Example mappings for 16PSK constellations, in accordance with aspects of the present invention, will now be described in greater detail with reference to FIGS. 6A-B.

Figure 6A:
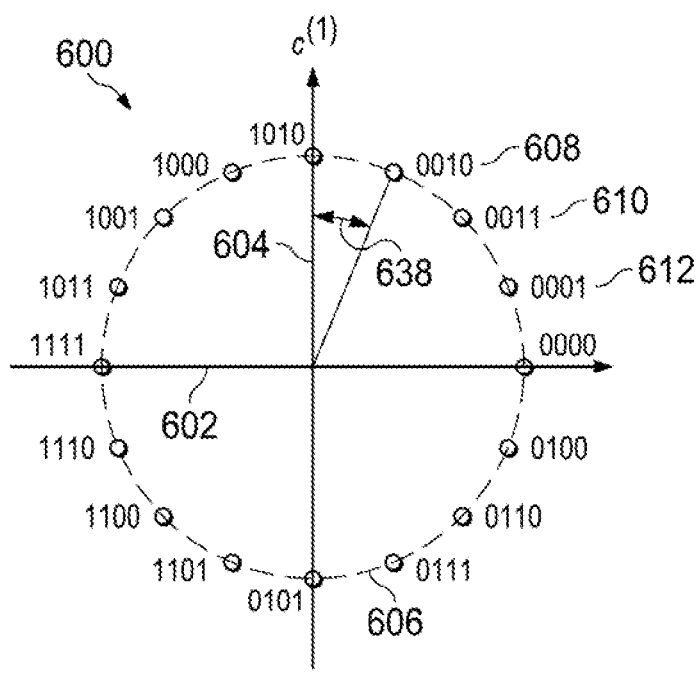
FIG. 6A illustrates an example 16PSK mapping constellation.

FIG. 6A illustrates an example 16PSK mapping constellation, 600.

As shown in the figure, constellation 600 has an x-axis 602, a y-axis 604 and a radius 606. Bit streams map to symbols at radius 606 at an integer multiple of a phase angle of 22.5°, example bit streams of which are labeled 608, 610 and 612. With constellation 600, 16 binary numbers, each of which consists of four binary bits, are mapped to 16 symbols, respectively. For example a bit stream 0010 as indicated by 608 lies on radius 606 at phase angle of 67.5°, a bit stream 0011 as indicated by 610 lies on radius 606 at phase angle of 45° and a bit stream 0001 as indicated by 612 lies on radius 606 at phase angle of 22.5°.

With a 16PSK mapping constellation, four separated bits may be mapped to a single symbol. The mapping continues until all bits within a bit stream are mapped to a symbol. In some embodiments, all mappings are performed to a single constellation. In some embodiments mappings may be performed to different constellations.

Figure 6B:
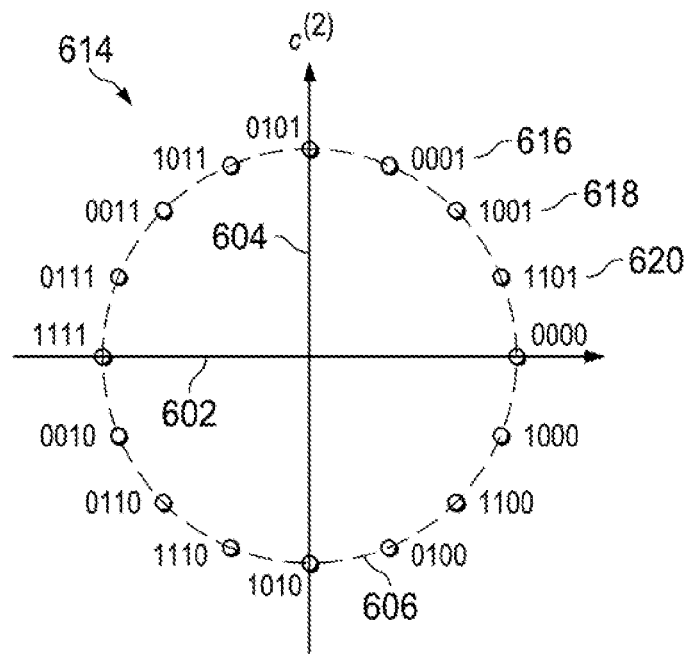
FIG. 6B illustrates another example 16PSK mapping constellation.

FIG. 6B illustrates another example 16PSK mapping constellation, 614.

As shown in the figure, constellation 614 has x-axis 602, y-axis 604 and radius 606. Bit streams map to symbols at radius 606 at an integer multiple of a phase angle of 22.5°, example bit streams of which are labeled 616, 618 and 620. With constellation 614, 16 binary numbers, each of which consists of four binary bits, are mapped to 16 symbols, respectively. For example a bit stream 0001 as indicated by 616 lies on radius 606 at phase angle of 67.5°, a bit stream 1001 as indicated by 618 lies on radius 606 at phase angle of 45° and a bit stream 1101 as indicated by 620 lies on radius 606 at phase angle of 22.5°. As such, by comparing constellation 600 of FIG. 6A with constellation 614 of FIG. 6B, a symbol of a radius and a specific angle in constellation 600 corresponds to a different bit stream than a symbol of the same radius and the same specific angle in constellation 614. For example, bit stream 608 of constellation of 600 is different from bit stream 616 of constellation 614, even though each will have the same 16PSK symbol.

In the non-limiting examples discussed above, bits may be mapped to symbols by a single 16PSK constellation, or by a plurality of 16PSK constellations. So long as a receiver has knowledge of the encoding scheme used by a transmitter, the receiver will be able to decode non-compromised data by any known manner or system.

The non-limiting example 8PSK and 16PSK mapping discussed above with reference to FIGS. 5A-6B enable mapping of three binary bits to a single 8PSK symbol, of an 8-symbol set, and four binary bits to single 16PSK symbol, of a 16-symbol set, respectively. However, aspects of the p scent invention may be applied to larger symbol sets, by additionally addressing changes in amplitude of the symbol.

As mentioned above, as possible that at least one of the constellations could be an APSK constellation, an example of which will now be discussed in FIG. 7.

Figure 7:
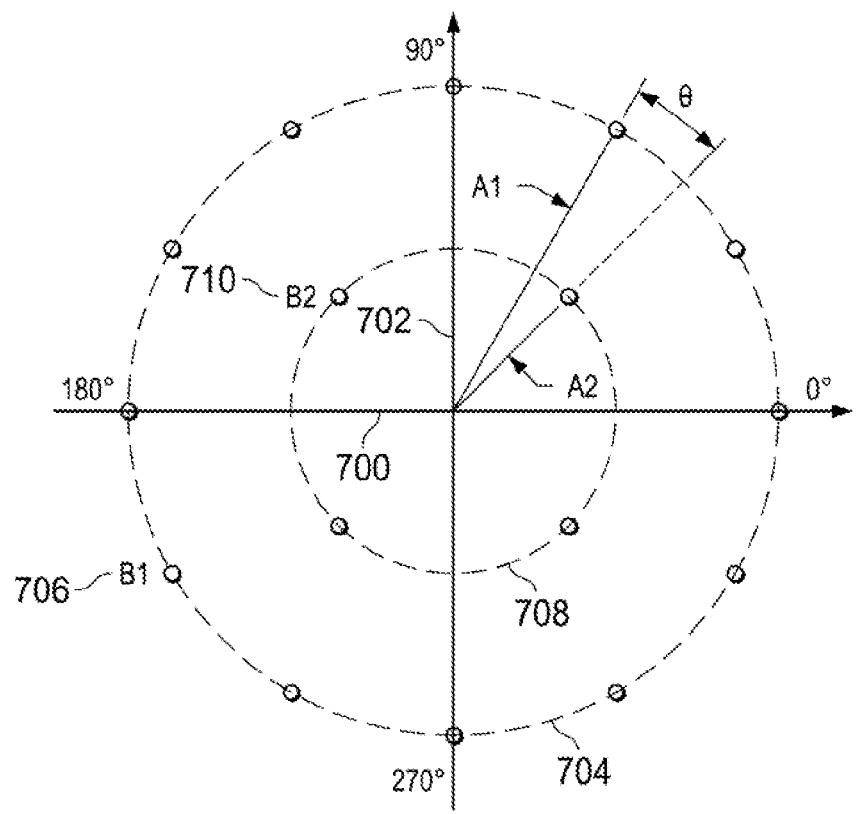
FIG. 7 illustrates an example of 16APSK mapping constellation.

FIG. 7 illustrates an example of 16APSK mapping constellation.

Amplitude and phase-shift keying or asymmetric phase-shift keying (APSK), is a PSK scheme that conveys data by changing, or modulating, both the amplitude and the phase of a reference signal (the carrier wave). In other words, it combines both amplitude-shift keying (ASK) with the phase-shift keying (PSK) to increase the symbol-set.

As shown in the figure, there is an x-axis 700, a y-axis 702, a radius 704 and a radius 708. The constellation allows mapping for 16 binary numbers 16 symbols, examples of which are indicated by 706 and 710.

Bit streams map to symbols at radius 704 at an integer multiple of a phase angle of 30°, an example symbol of which is labeled 706. Other bit streams map to symbols at radius 708 at an integer multiple of a phase angle of 45°, an example symbol of which is labeled 710.

As compared to the 8PSK and 16PSK constellation mapping discussed above with reference to FIGS. 5A-6B, an APSK constellation, for example is discussed with reference to FIG. 7, enables differentiation between symbols additionally based on radius.

The non-limiting example 8PSK, 16PSK and APSK mapping discussed above with reference to FIGS. 5A-7 do not limit the scope of the invention, but are merely provided for purposes of discussion. It should be noted that any known mapping scheme may be used.

Mapping bit stream 402 to stream of symbols 404 provides an efficient mechanism for transmitting three bits of data for each symbol. However, this portion of the mapping fails to address impairments that limit communication performance of PLC, namely frequency selective channels and narrowband interference. Aspects of the present invention address these impairments by assigning each symbol to at least two different sub-bands for conversion into at least two different OFDM symbols. This will be described in greater detail with reference to FIGS. 8-9.

Figure 8:
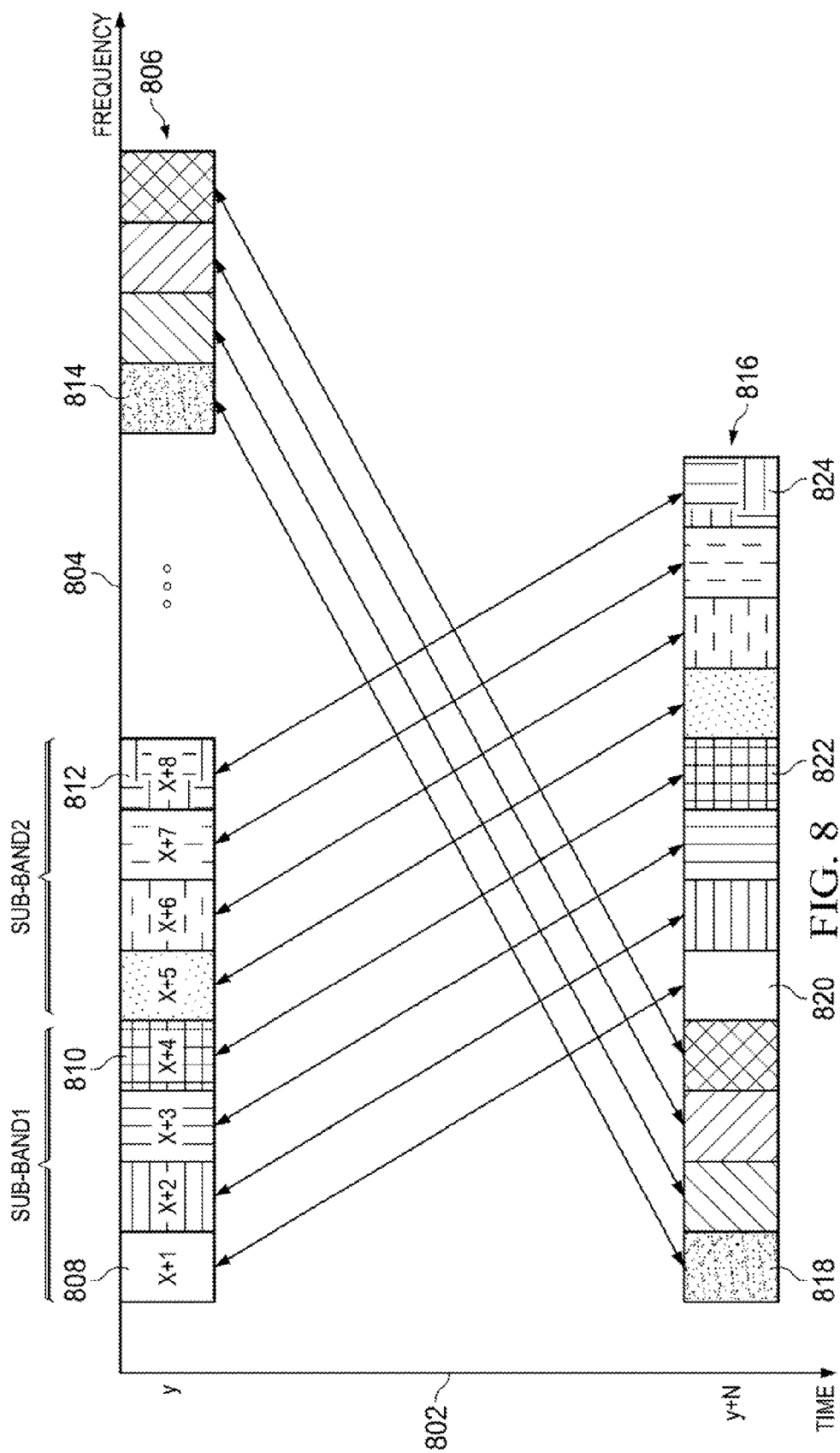
FIG. 8 illustrates symbol rearrangement over time in accordance with aspects of the present invention.

FIG. 8 illustrates symbol rearrangement over time in accordance with aspects of the present invention.

As shown in the figure, a y-axis 802 corresponds to time, whereas an x-axis 804 corresponds to frequency. The figure includes a stream of symbols 806 that includes a plurality of symbols, each of which is assigned to a specific sub-band, samples of which are indicated as sub-band 808, sub-band 810, sub-band 812 and sub-band 814. The figure further includes a stream of symbols 816 that includes a plurality of symbols, each of which is assigned to a specific sub-band, samples of which are indicated as sub-band 818, sub-band 820, sub-band 822 and sub-band 824.

For purposes of discussion, consider a stream of symbols as created in a manner similar to stream of symbols 404 discussed above with reference to FIG. 4. Let the first created symbol be assigned to sub-band 808, the second symbol be assigned to the next sub-band, and so on, to create stream of symbols 806.

Now for purposes of discussion, returning to FIG. 3, suppose that transmission line 102 has transmission medium characteristics such that there are frequency selective channels and narrowband interference at certain sub-bands. In particular, for purposes of discussion, let transmission line 102 generate particularly high interference within the sub-band associated with sub-band 808. In such a case, the symbol assigned to sub-band 808 and transmitted from transmitter 302 in sub-band 808 would likely be corrupted while transmitting through transmission line 102 to receiver 304.

However, in accordance with aspects of the present invention, the symbol that is assigned to sub-band 808 in stream of symbols 806 is additionally assigned to sub-band 820 within stream of symbols 816. For purposes of discussion, in this case, let transmission line 102 generate very low interference within the sub-band associated with sub-band 808. In this case, the symbol assigned to sub-band 820 and transmitted from transmitter 302 in sub-band 820 would not likely be corrupted while transmitting through transmission line 102 to receiver 304. Therefore, even though the symbol may have been corrupted in stream of symbols 806, it would not have been corrupted in stream of symbols 816.

In the above-discussed example in FIG. 8, a stream of symbols is rearranged a second time to create a second stream of symbols. This is a non-limiting example provided to illustrate an aspect of the present invention. It should be noted that the stream of symbols may be rearranged K times, to create K streams of symbols, wherein K is an integer greater than 1. Clearly as the number of streams of symbols are created for a particular original set of symbols, the overall efficiency of the transmission decreases as a result of duplication. However, if a particular transmission medium has extremely high impairments associated with multiple frequency bands, such an increase in stream creation may be warranted.

By rearranging the symbols to different sub-bands for to create different streams of symbols for transmission, a PLC system in accordance with aspects of the present invention may greatly decrease impairments that limit communication performance, namely frequency selective channels and narrowband interference.

Rearrangement of symbols to different sub-bands fails to address transmission impairments associated with cyclic impulsive noise discussed above with reference to FIG. 2. To address this issue, the OFDM symbols generated from the stream of symbols are transmitted at different times. This aspect of the present invention will now be described in greater detail with reference to FIGS. 4 and 8-15.

Returning to FIG. 4, once bit stream 402 has been mapped to stream of symbols 404, stream of symbols 404 is then converted to OFDM symbol 406 by any known method, non-limiting examples of which include an Inverse Fast Fourier Transform (IFFT). In this light, returning to FIG. 8, stream of symbols 806 will be converted to a first OFDM symbol and stream of symbols 816 will be converted to a second OFDM symbol. Let the first OFDM symbol be slated for transmission at time y, whereas the second OFDM symbol be slated for transmission at time y+N. The difference in time for transmission is therefore, N. This time difference in transmission of the OFDM symbols reduces impairments associated with cyclic impulsive noise, which will be discussed further with reference to FIG. 9.

Figure 9:
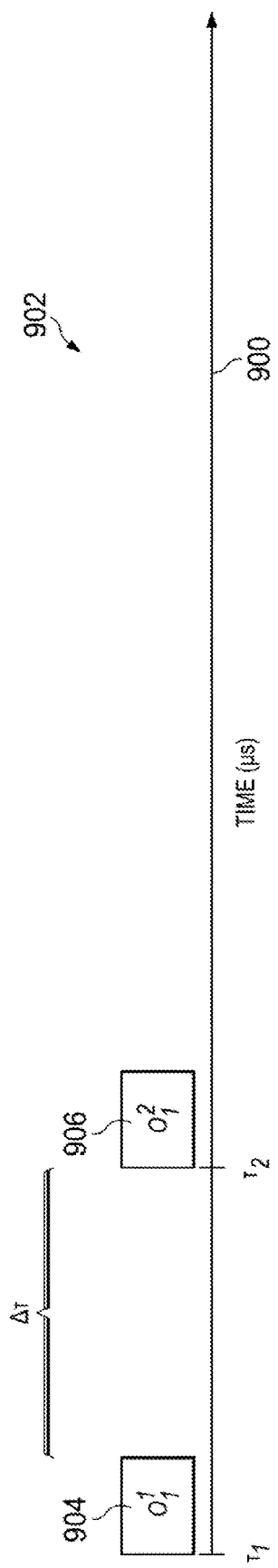
FIG. 9 illustrates a stream of orthogonal frequency division multiplexing (OFDM) symbols for transmission in accordance with aspects of the present invention.

FIG. 9 illustrates a stream of OFDM symbols 902 for transmission, in accordance with aspects of the present invention.

FIG. 9 includes an axis 900 of time in units of μs, and a stream of OFDM symbols 902, which includes OFDM symbols 904 and 906.

Let OFDM symbol 904 correspond to the OFDM symbol generated from stream of symbols 806 as discussed above with reference to FIG. 8. In FIG. 9, OFDM symbol 904 is transmitted from transmitter 302 at time $\tau_1$ and is illustrated as "$O_t^1$", wherein "O" stands for OFDM symbol, subscript "$_t$" indicates that this is the first symbol, and superscript "$^1$" indicates that this is the first OFDM symbol associated with a particular stream of symbols. Similarly, let OFDM symbol 906 correspond to the OFDM symbol generated from stream of symbols 816 as discussed above with reference to FIG. 8. In FIG. 9, OFDM symbol 906 is transmitted from transmitter 302 at time r, and is illustrated as "$O_1^2$", wherein "superscript $^2$" indicates that this is the second OFDM symbol associated with the same stream of symbols as associated with OFDM symbol 904.

In accordance with this aspect of the present invention, related OFDM symbols may be sufficiently spaced to reduce impairments associated with cyclic impulsive noise. This will be described in greater detail with reference to FIGS. 10-12.

Figure 2:
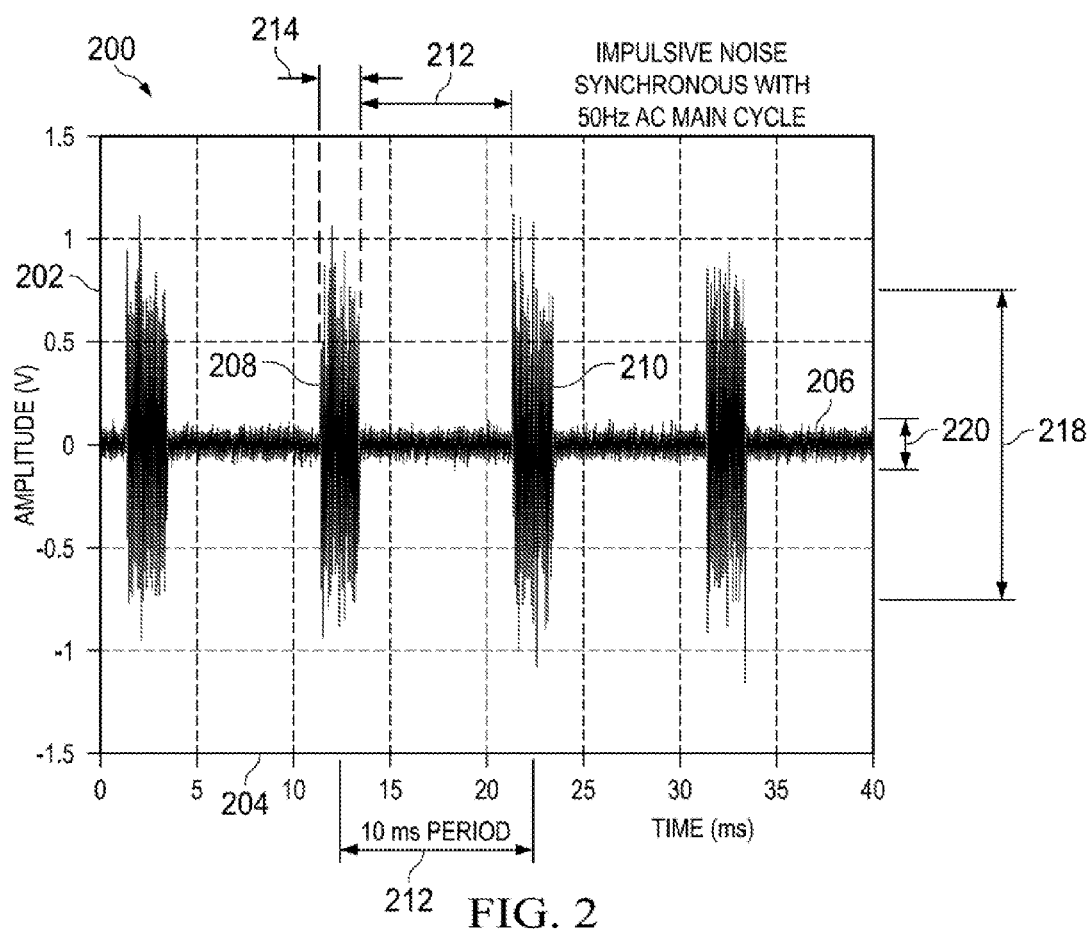
FIG. 2 is a graph illustrating impulsive noise in a PLC line.
Figure 10:
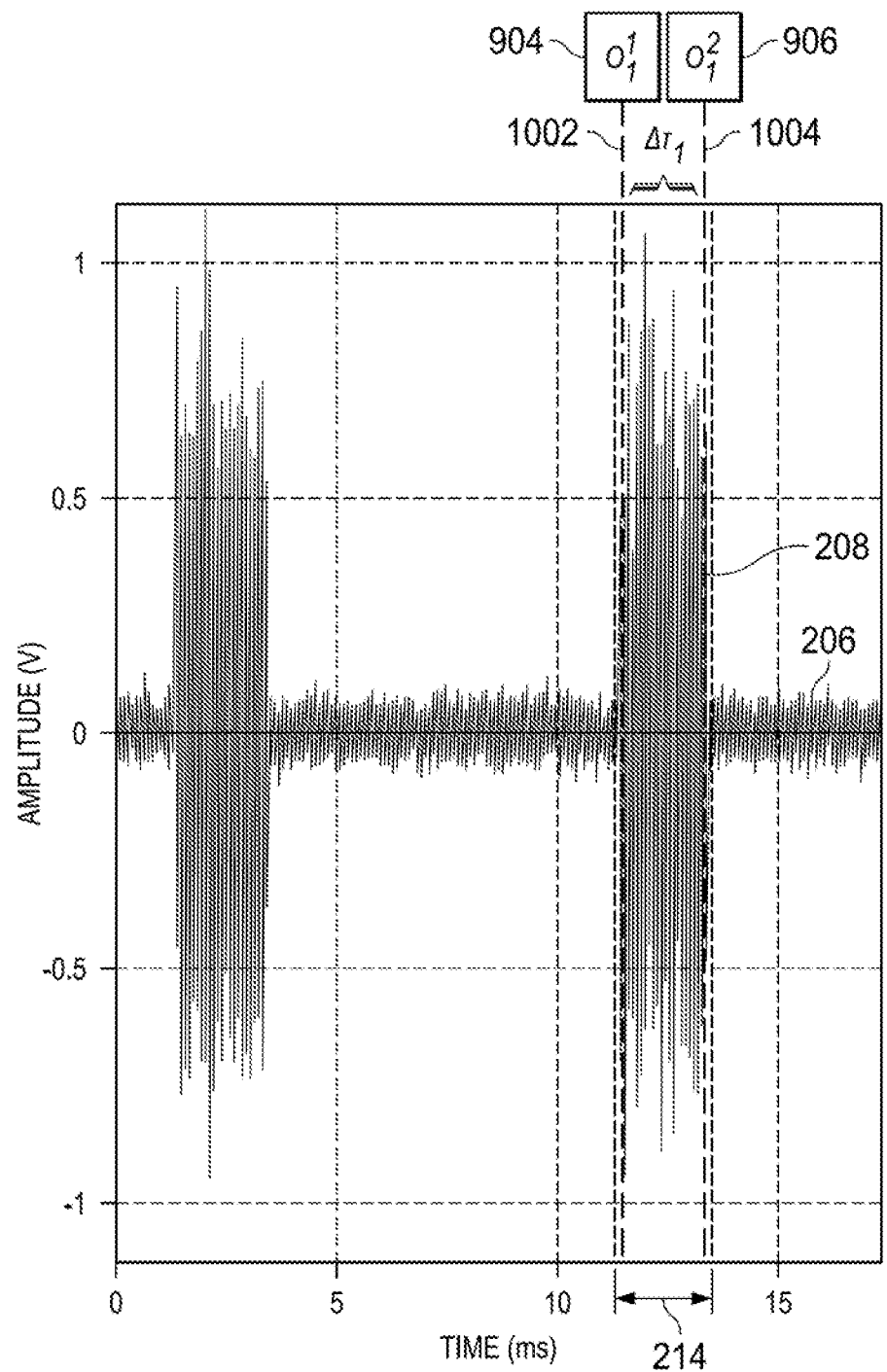
FIG. 10 illustrates an exploded view of a portion of the graph of FIG. 2 in a situation where two OFDM symbols are transmitted.

FIG. 10 illustrates an exploded view of a portion of the graph of FIG. 2 in a situation where two OFDM symbols are transmitted.

As shown in FIG. 10, in this example, OFDM symbol 904 is transmitted during the ON period of impulse 208, as shown by dotted line 1002, and OFDM symbol 906 is transmitted during the ON period of impulse 208, as shown by dotted line 1004.

Returning to FIG. 9, OFDM symbol 904 and OFDM symbol 906 each contain the same pre-OFDM symbols, or TFDM symbols. Granted, in OFDM symbol 904, those TFDM symbols are arranged in a specific order with respect to sub-bands, whereas in OFDM symbol, those same TFDM symbols are arranged in another order with respect to the sub-bands. Nevertheless, OFDM symbol 904 and OFDM symbol 906 are based on the same TFDM symbols.

Now returning to FIG. 10, OFDM symbol 904 is spaced from OFDM symbol 906 by a time $\Delta\tau_1$, which is less than the ON period of impulse 208. Because OFDM symbol 904 and OFDM symbol 906 are transmitted at a time that is coincident with pulse 208, both of OFDM symbol 904 and OFDM symbol 912 will be corrupted from the extremely large amplitude generated by pulse 208. Therefore, a receiver would be unable to correctly decode the original data corresponding to both OFDM symbol 904 and OFDM symbol 906. In accordance with aspects of the present invention, this situation is averted by spacing OFDM symbols, which are based on the same TFDM symbols, by a time that is greater than the width of pulse 208. This will be described in greater detail with reference to FIGS. 11-12.

Figure 11:
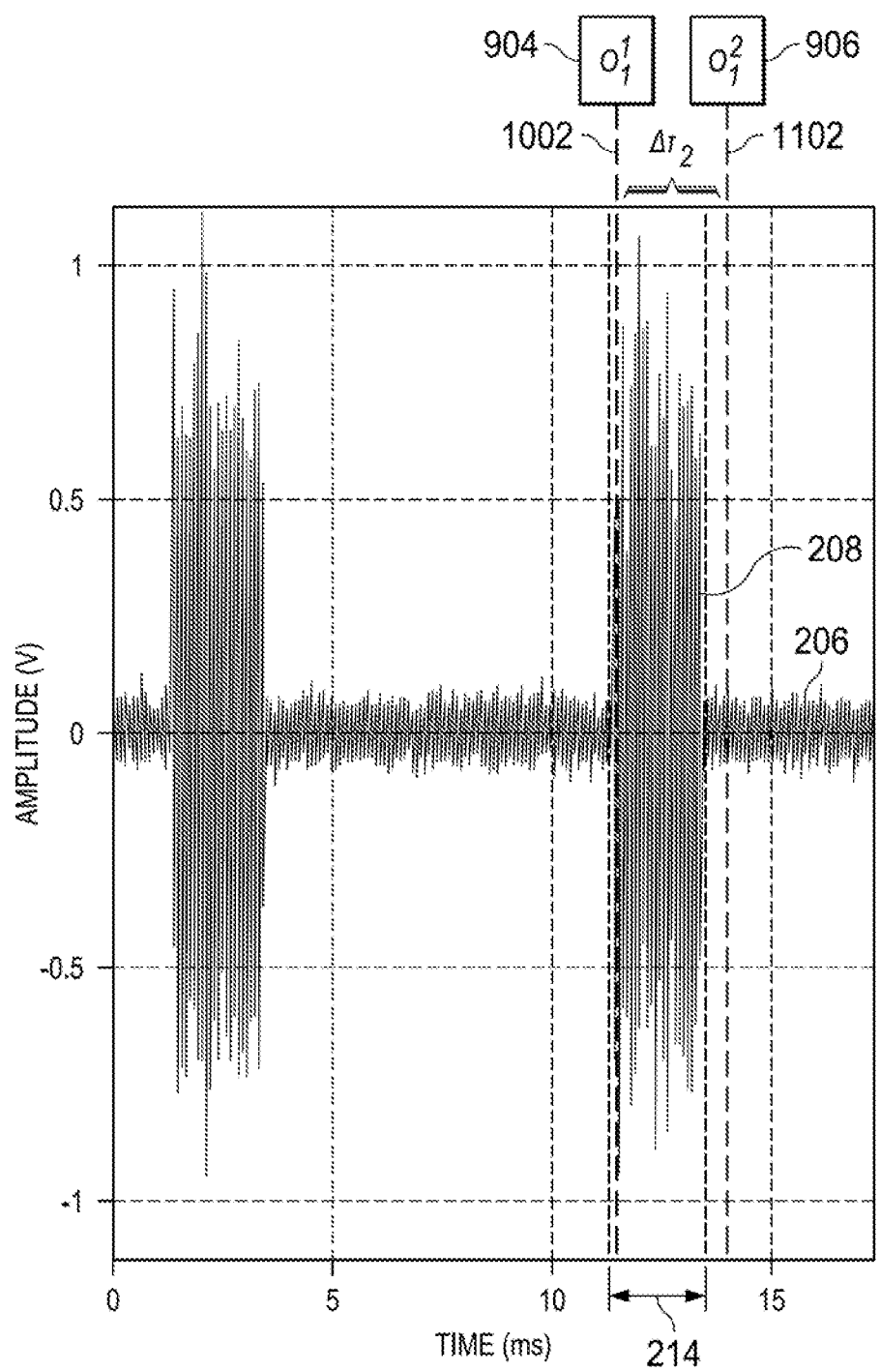
FIG. 11 illustrates an exploded view of a portion of the graph of FIG. 2 in another situation where two OFDM symbols are transmitted.

FIG. 11 illustrates an exploded view of a portion of the graph of FIG. 2 in another situation where two OFDM symbols are transmitted.

As shown in FIG. 11, in this example, OFDM symbol 904 is transmitted during the ON period of impulse 208, as shown by dotted line 1002. However, in this example, OFDM symbol 906 is transmitted after the ON period of impulse 208, as shown by dotted line 1102.

In this example, OFDM symbol 904 is spaced from OFDM symbol 906 by a time $\Delta\tau_2$, which is greater than the ON period of impulse 208. In this example, only OFDM symbol 904 is transmitted at a time that is coincident with pulse 208, whereas OFDM symbol 906 is transmitted at a time after pulse 208. Accordingly, only OFDM symbol 904 will be corrupted from the extremely large amplitude generated by pulse 208. Therefore, a receiver would be unable to correctly decode the original data corresponding to OFDM symbol 904. However, a receiver would be able to correctly decode the original data corresponding to OFDM symbol 906.

Figure 12:
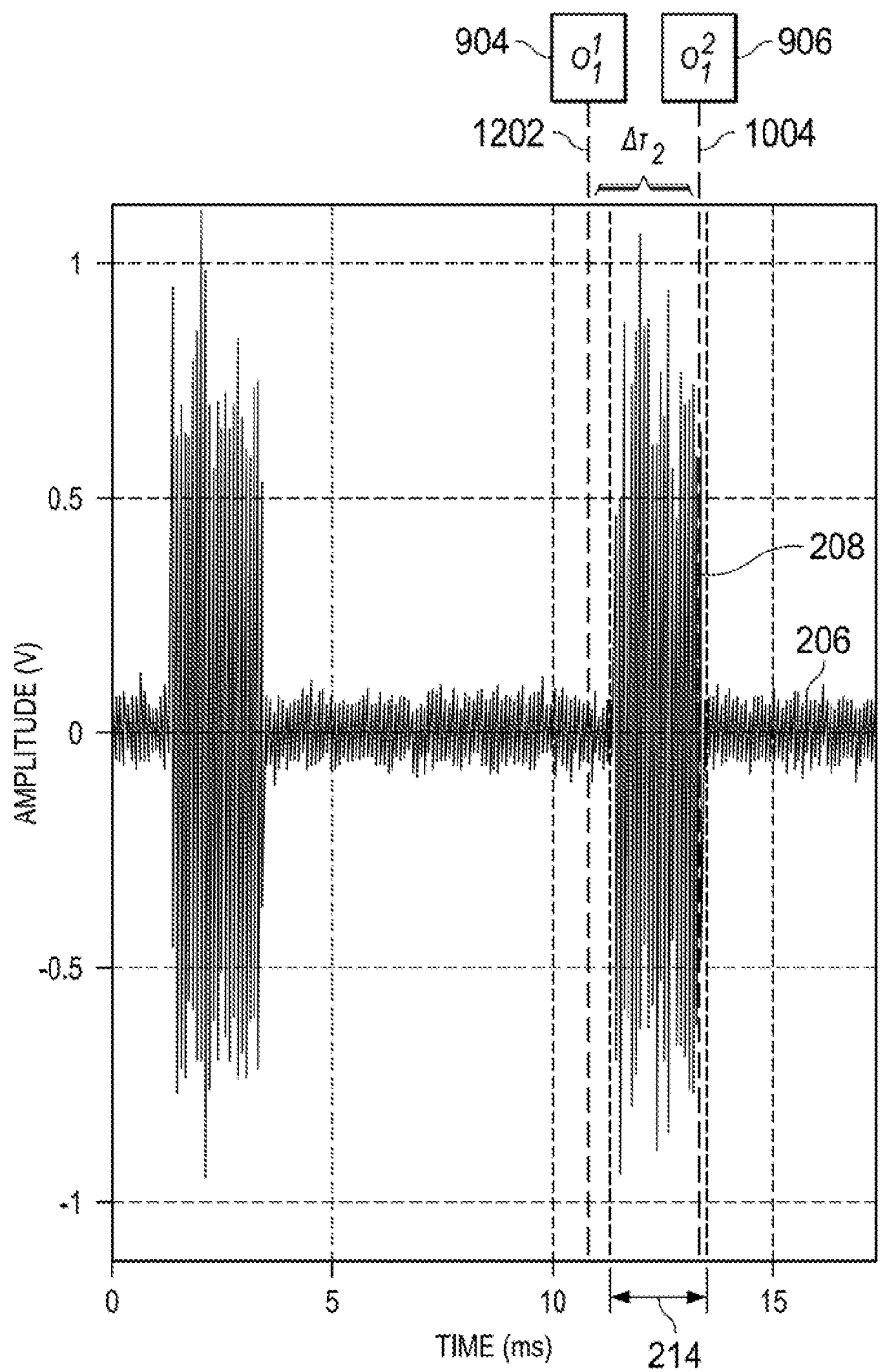
FIG. 12 illustrates an exploded view of a portion of the graph of FIG. 2 in another situation where two OFDM symbols are transmitted.

FIG. 12 illustrates an exploded view of a portion of the graph of FIG. 2 in another situation where two OFDM symbols are transmitted;

As shown in FIG. 12, in this example, OFDM symbol 906 is transmitted during the ON period of impulse 208, as shown by dotted line 1004. However, in this example, OFDM symbol 904 is transmitted before the ON period of impulse 208, as shown by dotted line 1202.

In this example, OFDM symbol 904 is again spaced from OFDM symbol 906 by time $\Delta\tau_2$, which is greater than the ON period of impulse 208. In this example, only OFDM symbol 906 is transmitted at a time that is coincident with pulse 208, whereas OFDM symbol 904 is transmitted at a time before pulse 208. Accordingly, only OFDM symbol 912 will be corrupted from the extremely large amplitude generated by pulse 208. Therefore, a receiver would be unable to correctly decode the original data corresponding to OFDM symbol 906. However, a receiver would be able to correctly decode the original data corresponding to OFDM symbol 904.

FIG. 8 illustrates two arrangements for a particular stream of symbols. This double transmission decreases impairments due to frequency selective channels, narrowband interference, and cyclic impulsive noise. However, this is still a chance that both transmitted OFDM symbols may be corrupted. To reduce this likelihood, a particular stream of symbols may be arranged in more than two arrangements. This will be described in greater detail with reference to FIG. 13.

Figure 13:
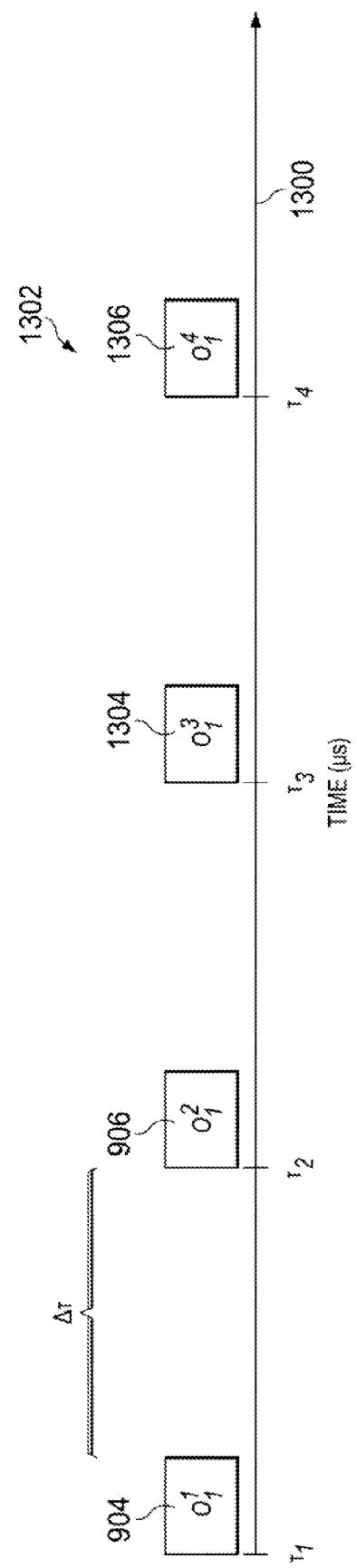
FIG. 13 illustrates another stream of orthogonal frequency division multiplexing (OFDM) symbols for transmission in accordance with aspects of the present invention.

FIG. 13 illustrates a stream of OFDM symbols 1302 for transmission, in accordance with aspects of the present invention.

FIG. 13 includes an axis 1300 of time in units of μs, and a stream of OFDM symbols 1302, which includes OFDM symbols 904, 906, 1304 and 1306.

Let OFDM symbol 1304 correspond to the OFDM symbol generated from stream of symbols 806 in a manner similar discussed above with reference to FIG. 8. In OFDM symbol 1304 however, the TFDM symbols would have been assigned to different sub-bands as those of associated with OFDM symbols 904 and 906. In FIG. 13, OFDM symbol 1304 is transmitted from transmitter 302 at time $\tau_3$ and is illustrated as "$O_1^3$", wherein "O" stands for OFDM symbol, subscript "$_1$" indicates that this is the first symbol, and superscript "$^3$" indicates that this is the third OFDM symbol associated with the same stream of symbols as associated with OFDM symbol 904. Similarly, let OFDM symbol 1306 correspond to the OFDM symbol generated from stream of symbols 806 in a manner similar discussed above with reference to FIG. 8. In OFDM symbol 1306 however, the TFDM symbols would have been assigned to different sub-bands as those of associated with OFDM symbols 904, 906 and 1304. In FIG. 13, OFDM symbol 1306 is transmitted from transmitter 302 at time $\tau_4$ and is illustrated as "$O_1^4$", wherein "superscript $^4$" indicates that this is the fourth OFDM symbol associated with the same stream of symbols as associated with OFDM symbol 904.

The example discussed above with reference to FIG. 13 is non-liming and is provided to illustrate that any number or similar OFDM symbols may be transmitted for an original set of data. The repetitive transmission will have a disadvantage of a decreased data rate, but an advantage of an increased chance of the receiver receiving an uncompromised data set.

As shown in FIG. 13, there is much time between transmission of OFDM symbol 904 and OFDM symbol 906. Clearly this delay in time reduces impairments due to cyclic impulsive noise. However, such a transmission would waste bandwidth. In accordance with another aspect of the present invention, another set of data may be converted to OFDM symbols for interlaced transmission so as to more effectively use the open time slots. This will be described in greater detail with reference to FIGS. 14-15.

FIG. 14 illustrates a stream of OFDM symbols 1402 for transmission, in accordance with aspects of the present invention.

FIG. 14 includes an axis 1400 of time in units of is, and a stream of OFDM symbols 1402, which includes OFDM symbols 904, 906, 1404 and 1406.

Let OFDM symbol 1404 correspond to an OFDM symbol generated from a different stream of symbols, but generated in a manner similar to stream of symbols 806 as discussed above with reference to FIG. 8. In FIG. 14, OFDM symbol 1404 is transmitted from transmitter 302 at time $\tau_2$ and is illustrated as "$O_2^1$", wherein "O" stands for OFDM symbol, subscript "$_2$" indicates that this is the second symbol, and superscript "$^1$" indicates that this is the first OFDM symbol associated with a particular stream of symbols. Similarly, let OFDM symbol 1406 correspond to the OFDM symbol generated from a second stream of symbols related to OFDM symbol 1404, in a relationship similar to that between stream of symbols 806 and stream of symbols 816 of FIG. 8. In FIG. 14, OFDM symbol 1406 is transmitted from transmitter 302 at time $\tau_4$ and is illustrated as "$O_2^2$", wherein "superscript "$^2$"" indicates that this is the second OFDM symbol associated with the same stream of symbols as associated with OFDM symbol 1404.

In the example of FIG. 14, two original data sets may be transformed into two OFDM symbols each, respectively. The OFDM symbols are transmitted in an interlaced fashion so as to reduce impairments due to cyclic impulsive noise and to more effectively use the transmission bandwidth.

The concepts discussed above with reference to FIGS. 13 and 14 may be combined such that more than two OFDM symbols for an original data set may be transmitted, and more than two original data sets may be transmitted. This will be described in greater detail with reference to FIG. 15.

FIG. 15 illustrates a stream of OFDM symbols 1502 for transmission, in accordance with aspects of the present invention.

FIG. 15 includes an axis 1500 of time in units of is, and a stream of OFDM symbols 1502, which includes OFDM symbols 904, 906, 1304, 1306, 1404, 1406, 1504, 1506, 1508, 1510, 1512, 1514, 1516, 1518, 1520 and 1522.

In this example, four original data sets are transformed into for OFDM symbols each and are transmitted in an interlaced fashion.

Let OFDM symbol 1504 correspond to the OFDM symbol generated from the stream of data associated with OFDM symbol 1404 in a manner similar discussed above with reference to FIG. 8. In OFDM symbol 1504 however, the TFDM symbols would have been assigned to different sub-bands as those of associated with OFDM symbols 1404 and 1406. In FIG. 15, OFDM symbol 1504 is transmitted from transmitter 302 at time $\tau_{10}$ and is illustrated as "$O_2^3$", wherein subscript "$_2$" indicates that this is the second symbol, and superscript "$^3$" indicates that this is the third OFDM symbol associated with the same stream of symbols as associated with OFDM symbol 1404. Similarly, let OFDM symbol 1506 correspond to the OFDM symbol generated from the stream of data associated with OFDM symbol 1404 in a manner similar discussed above with reference to FIG. 8. In OFDM symbol 1506 however, the TFDM symbols would have been assigned to different sub-bands as those of associated with OFDM symbols 1404, 1406 and 1504. In FIG. 15, OFDM symbol 1506 is transmitted from transmitter 302 at time $\tau_4$ and is illustrated as "$O_2^4$", wherein "superscript "$^4$"" indicates that this is the fourth OFDM symbol associated with the same stream of symbols as associated with OFDM symbol 1404.

Further, one will note by the superscripts and subscripts that OFDM symbols 1508, 1501, 1512 and 1514 correspond to a third set of data. Further, for similar reasons as discussed above, each of OFDM symbols 1508, 1501, 1512 and 1514 are generated from an original third stream of data associated with symbols in a manner similar discussed above with reference to FIG. 8.

Similarly, one will note by the superscripts and subscripts that OFDM symbols 1516, 1518, 1520 and 1522 correspond to a fourth set of data. Further, for similar reasons as discussed above, each of OFDM symbols 1516, 1518, 1520 and 1522 are generated from an original fourth stream of data associated with symbols in a manner similar discussed above with reference to FIG. 8.

In the example of FIG. 15, four original data sets may be transformed into four OFDM symbols each, respectively. The OFDM symbols are transmitted in an interlaced fashion so as to reduce impairments due to cyclic impulsive noise and to maximize the transmission bandwidth.

In the embodiments discussed above, the TFDM symbols generated from M-bits may be mapped to sub-bands in different OFDM symbols (to provide time diversity) and to different sub-band indices (to provide frequency diversity). Some embodiments reduce the memory requirements as the mapping for TFDM symbols is between consecutive OFDM symbols and sub-bands.

The symbols can then be differentially modulated, either in the time domain or in the frequency domain before going through the inverse Fast Fourier Transform (IFFT).

The constellation mappings can be unique for all the sub-bands/symbols, the same for all the sub-bands/symbols, or a mix between the same and unique for all sub-bands/symbols. In some embodiments the constellation mappings may be restricted to lie on the unit circle i.e., the information bits are mapped onto symbols correspond to PSK (or differential PSK) symbols. Using PSK symbols is especially advantageous for constant modulus signals, where the peak-to-average is constant or nearly constant. Using PSK symbols is especially advantageous, because they can be extended to differential modulations. In some embodiments, the information bits are mapped onto symbols that correspond to amplitude PSK (APSK) symbols, where the bit information is mapped to both phase and amplitude. In some embodiments, the information bits are mapped onto symbols that correspond to differential APSK (DAPSK) symbols, where the bit information is mapped to both phase and amplitude and differentially encoded, i.e., the previous symbols' amplitude and phase and taken into account when determining the current symbols' amplitude and phase. In some embodiments, the information bits are mapped onto symbols that correspond to QAM symbols.

The mapped symbols can then be either differentially or coherently modulated in the frequency domain, before being transformed into the time domain using the inverse Fast Fourier Transform (IFFT).

Differential modulation occurs in the frequency domain using orthogonal frequency division multiplexing (OFDM) symbol streams. Each of the OFDM symbol streams contains several sub-bands. The first sub-band of the OFDM symbol stream contains a pilot symbol. The next sub-band is differentially modulated based on the value of the pilot symbol. Subsequent sub-bands are differentially modulated based on the value of the previous sub-band resulting in the final OFMD symbol stream.

Figure 16:
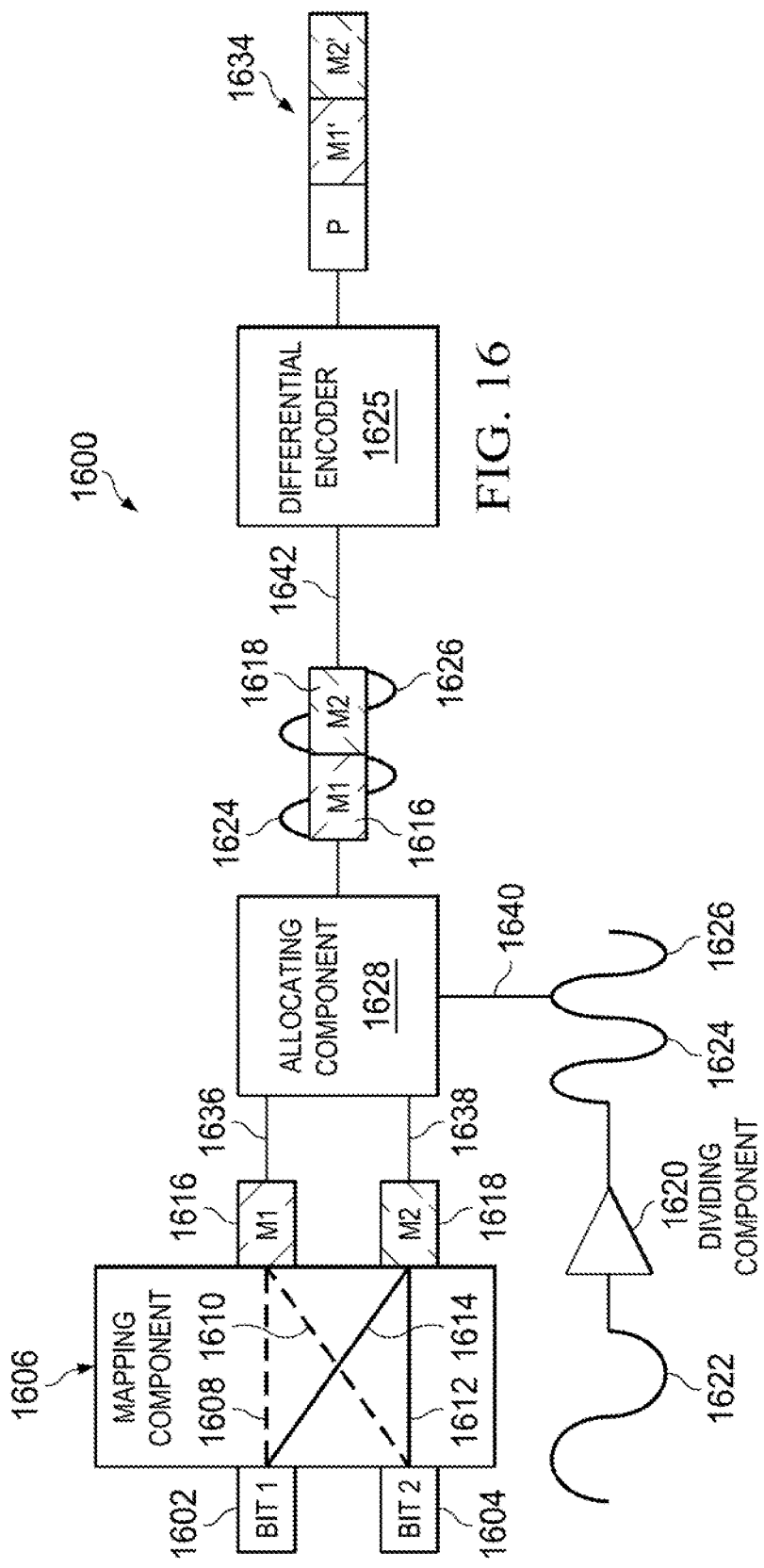
FIG. 16 illustrates an example OFDM transmitter using time-frequency diversity modulation (TFDM), in accordance with aspects of the present invention.

FIG. 16 illustrates an example of a differential encoding system 1600, in accordance with aspects of the present invention.

As shown in the figure, system 1600 includes bit 1602, bit 1604, mapping component 1606, mappings 1608, 1610, 1612 and 1614, symbol 1616, symbol 1618, allocating component 1628, transmission band 1622, dividing component 1620, sub-bands 1624 and 1626, differential encoder 1625, symbol stream 1634 and communication channels 1636, 1638, 1640 and 1642. Communication channels 1636, 1638, 1640 and 1642 may be any known type of channel for transferring data, non-limiting examples of which include wired and wireless.

Mapping component 1606 is connected to allocating component 1628 by communication channel 1636 and communication channel 1638. Dividing component 1620 is connected to allocating component 1628 by communication channel 1640. Allocating component 1628 is connected to differential encoder 1625 by communication channel 1642.

Mapping component 1606 is operable to encode bit 1602 to symbol 1616 by mapping 1608 and to symbol 1618 by mapping 1614. Mapping component 1606 is operable to encode bit 1604 to symbol 1616 by mapping 1610 and to symbol 1618 by mapping 1612. Mapping component 1606 is operable to transmit symbol 1616 to allocating component 1628 by communication channel 1636. Mapping component 1606 is operable to transmit symbol 1618 to allocating component 1628 by communication channel 1638.

Dividing component 1620 is operable to divide transmission band 1622 into sub-band 1624 and sub-band 1626. Dividing component 1620 is operable to transmit sub-band 1624 and sub-band 1626 to allocating component 1628 by communication channel 1640.

Allocating component 1628 is operable to allocate symbol 1616 to sub-band 1624 and symbol 1618 to sub-band 1626 and transmit the encoded sub-bands to differential encoder 1625 by communication channel 1642.

Differential encoder 1625 is operable to differentially encode symbol 1616 and symbol 1618. Differential encoder 1625 is operable to produce symbol stream 1634.

Mapping component 1606 maps bits 1602 and 1604 to symbol 1616 in a first sub-band by mapping 1608 and 1614 respectively. Mapping component 1606 also maps bits 1602 and 1604 to symbol 1618 in a second sub-band by mapping 1610 and 1612 respectively.

Transmission band 1622 is divided into two sub-bands 1624 and 1626 by dividing component 1620. Allocating component 1628 allocates symbol 1616 to sub-band 1624 in the first sub-band and symbol 1618 to sub-band 1626 in the second sub-band.

Another aspect of the present invention, which extends the application of differential modulation after DCM, is accomplished as differential encoder 1625 encode the symbol stream containing symbols 1616 and 1618, resulting in symbol stream 1634 and is described in greater detail in FIG. 16.

Differential encoder 1625 will now be discussed in greater detail.

Figure 17:
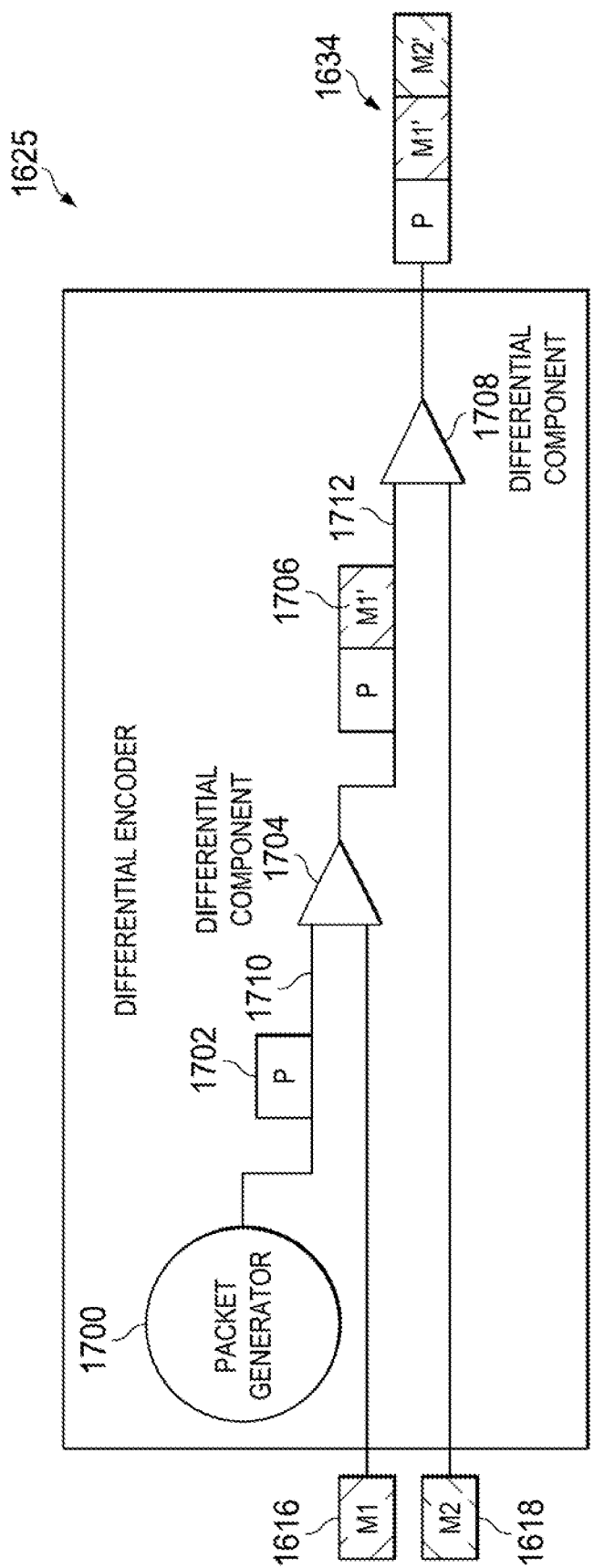
FIG. 17 illustrates an exploded view of an example implementation of the differential encoder of FIG. 16, in accordance with aspects of the present invention.

FIG. 17 illustrates an exploded view of an example implementation of differential encoder 1625 as discussed above with reference to FIG. 16, in accordance with aspects of the present invention.

As shown in FIG. 17, differential encoder 1625 includes symbol 1616, symbol 1618, packet generator 1700, pilot symbol 1702, differential component 1704, differential component 1708, symbol 1706, communication channels 1710 and 1712, and symbol stream 1634. Communication channels 1710 and 1712 may be any known type of channel for transferring data, non-limiting examples of which include wired and wireless.

Packet generator 1700 is connected to differential component 1704 by communication channel 1710. Differential component 1704 is connected to differential component 1708 by communication channel 1712.

Packet generator 1700 is operable to produce pilot symbol 1702 and transmit signal to differential component 1704 by communication channel 1710. Differential component 1704 is operable to differentially encode pilot symbol 1702 and symbol 1616 and symbol 1706 to differential component 1708 by communication channel 1712. Differential component 1708 is operable to differentially encode symbol 1618 with symbol 1706 to symbol stream 1634.

Packet generator 1700 generates pilot symbol 1702. Differential component 1704 differentially modulates symbol 1616 with pilot symbol 1702 resulting in symbol 1706. Differential component 1708 differentially modulates symbol 1618 with symbol 1706 resulting in symbol stream 1334.

After one OFDM symbol is transmitted, differential encoding system 1600 may transmit a second related OFDM symbol in a manner discussed above with reference to FIG. 8.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A method of encoding a set of L bits for transmission on a transmission band through a transmission medium, L being a positive integer that is greater than 1, said method comprising:

mapping, via a mapping component, the L bits into M symbols;

dividing, via a first dividing component, the transmission band into sub-bands;

allocating, via an allocating component, the M symbols to individual sub-bands, respectively, for transmission at a first time;

allocating, via the allocating component, the M symbols to different individual sub-bands, respectively, for transmission at a second time; and transmitting the M symbols at a first time and a second time.

2. The method of claim 1, further comprising:
generating, via a packet generator, a header; and
generating, via the packet generator, a transmission packet based on the allocated M symbols for transmission at a first time,
wherein the transmission packet includes the header, and
wherein an allocation pattern of the M symbols is communicated in the header.

3. The method of claim 1, wherein said allocating M symbols to different individual sub-bands, respectively, for transmission at a second time is based on the transmission medium.

4. The method of claim 3, wherein said allocating M symbols to different individual sub-bands, respectively, for transmission at a second time is based on noise characteristics of the transmission medium.

5. The method of claim 4, further comprising:
determining, at a receiver, characteristics of the transmission medium; and
transmitting, from the receiver to the allocating component, transmission medium characteristic information based on the determined characteristics of the transmission medium,
wherein said allocating M symbols to different individual sub-bands, respectively, for transmission at a second time is based on the transmission medium characteristic information.

6. The method of claim 4,
wherein the noise characteristics of the transmission medium includes a cyclic impulsive noise having a duty cycle having an ON portion for a first period of time and an OFF portion for a second period of time,
wherein the ON portion has a first amplitude and the OFF portion has a second amplitude,
wherein the first amplitude is greater than the second amplitude, and
wherein a difference between the second time and the first time is greater than the first period.

7. The method of claim 1, wherein said mapping the L bits into M symbols comprises mapping the L bits each of the M-symbols chosen from a different constellation set, respectively.

8. The method of claim 1, further comprising differentially encoding, via a differential encoder, the M symbols.

9. The method of claim 1, further comprising coherently encoding, via a coherent encoder, the M symbols.

10. A device for encoding a set of L bits for transmission on a transmission band through a transmission medium, L being a positive integer that is greater than 1, said device comprising:
a mapping component operable to map the L bits into M symbols;
a first dividing component operable to divide the transmission band into sub-bands;
an allocating component operable to allocate the M symbols to individual sub-bands, respectively, for transmission at a first time, and operable to allocate the M symbols to different individual sub-bands, respectively, for transmission at a second time; and
a packet generator operable to generate a header and a transmission packet based on the allocated M symbols for transmission at a first time,
wherein the transmission packet includes the header, and
wherein an allocation pattern of the M symbols is communicated in the header.

11. The device of claim 10, wherein said allocating component is operable to allocate the M symbols to different individual sub-bands, respectively, for transmission at the second time based on the transmission medium.

12. The device of claim 11, wherein said allocating component is operable to allocate the M symbols to different individual sub-bands, respectively, for transmission at the second time based on noise characteristics of the transmission medium.

13. The device of claim 12,
wherein said allocating is further operable to receive, from a receiver, transmission medium characteristic information based on characteristics of the transmission medium, and
wherein said allocating component is operable to allocate the M symbols to different individual sub-bands, respectively, for transmission at the second time based on the transmission medium characteristic information.

14. The device of claim 12,
wherein the noise characteristics of the transmission medium includes a cyclic impulsive noise having a duty cycle having an ON portion for a first period of time and an OFF portion for a second period of time,
wherein the ON portion has a first amplitude and the OFF portion has a second amplitude,
wherein the first amplitude is greater than the second amplitude, and
wherein a difference between the second time and the first time is greater than the first period.

15. The device of claim 10, wherein mapping component is operable to map the L bits into M symbols such that each of the M-symbols is chosen from a different constellation set, respectively.

16. The device of claim 10, further comprising a differential encoder operable to differentially encode the M symbols.

17. The device of claim 10, further comprising a coherent encoder operable to coherently encode the M symbols.

18. A device for encoding in a communication system, comprising:
a mapping component coupled to a dividing component by a communication channel, the mapping component to map a set of bits into a set of symbols;
the dividing component to divide the transmission band into a set of sub-bands and to transmit the set of sub-bands to an allocating component;
the allocating component to allocate the set of symbols to a first set of sub-bands, for transmission at a first time, and to allocate the set of symbols to a second set of sub-bands, for transmission at a second time, the allocating component to transmit the set of symbols to an encoder using the communication channel;
the encoder to encode the set of symbols to produce a symbol stream;
and a packet generator to generate a header and a transmission packet based on the allocated set of symbols for transmission at a first time, wherein the transmission packet includes the header.

19. The device of claim 18, wherein the allocating component is operable to allocate the set of symbols to a second set of sub-bands, for transmission at a second time based on noise characteristics of the transmission medium.

* * * * *